— United States Patent [19] — [11] Patent Number: 5,902,872
Kishimoto et al. — [45] Date of Patent: May 11, 1999

[54] RESIN FOR COATING FORMATION AND METHOD FOR PRODUCING THE SAME

[75] Inventors: Souichiro Kishimoto; Takamasa Ohwaki; Shinya Takagi; Tomohiro Hamada; Akihiko Hasegawa, all of Kyoto, Japan

[73] Assignee: Unitika, Ltd., Hyogo, Japan

[21] Appl. No.: 09/085,103

[22] Filed: May 28, 1998

[30] Foreign Application Priority Data

| May 29, 1997 | [JP] | Japan | 9-139703 |
| May 29, 1997 | [JP] | Japan | 9-139704 |
| May 29, 1997 | [JP] | Japan | 9-139705 |
| May 29, 1997 | [JP] | Japan | 9-139706 |
| Jul. 14, 1997 | [JP] | Japan | 9-187956 |
| Nov. 18, 1997 | [JP] | Japan | 9-316819 |

[51] Int. Cl.$^6$ .................................................. C08G 63/18
[52] U.S. Cl. ........................ 528/194; 528/179; 528/182; 528/190; 528/191; 528/274; 528/286; 528/298; 528/302; 528/308; 528/308.6; 524/81; 524/356; 524/366
[58] Field of Search ...................... 528/179, 182, 528/190, 191, 194, 274, 286, 298, 302, 308, 308.6; 524/81, 356, 366

[56] References Cited

U.S. PATENT DOCUMENTS

| 4,499,257 | 2/1985 | Maresca | 528/173 |
| 4,571,419 | 2/1986 | Maresca | 525/177 |
| 4,598,130 | 7/1986 | Robeson et al. | 525/439 |
| 4,931,364 | 6/1990 | Dickinson | 428/412 |
| 4,937,287 | 6/1990 | Dean | 525/152 |
| 5,030,505 | 7/1991 | Dickinson | 428/215 |

*Primary Examiner*—Samuel A. Acquah
*Attorney, Agent, or Firm*—Sughrue, Mion, Zinn, Macpeak & Seas, PLLC

[57] ABSTRACT

A resin for coating formation which comprises a polyarylate comprising 2,2-bis(3-methyl-4-hydroxyphenyl)propane units and a divalent carboxylic acid component comprising 10 to 90 mol % of terephthalic acid units and 90 to 10 mol % of isophthalic acid units, having an inherent viscosity measured in 1,1,2,2-tetrachloroethane at a concentration of 1 g/dl at 25° C. of 0.85 or more, and having a carboxyl value of 20 mol/ton or less. Also disclosed is a process for producing the resin by interfacial polymerization, using a quaternary ammonium salt or a quaternary phosphonium salt having at least 3 alkyl groups each having at least 3 carbon atoms as a catalyst.

14 Claims, No Drawings

RESIN FOR COATING FORMATION AND METHOD FOR PRODUCING THE SAME

FIELD OF THE INVENTION

The present invention relates to a resin for coating formation comprising a polyarylate containing specific divalent phenol units, and having a high molecular weight, excellent electrical characteristics and excellent wear resistance. The present invention also relates to a method for easily producing such a resin for coating formation.

BACKGROUND OF THE INVENTION

Noncrystalline polyarylates comprising units derived from 2,2-bis(4-hydroxyphenyl)propane (also referred to as bisphenol A) and units derived from terephthalic acid and isophthalic acid are well known as engineering plastics. Such polyarylates have high heat resistance, excellent mechanical strength as represented by impact strength and dimensional stability, and are also noncrystalline and transparent Molded articles thereof are therefore finding wide application in various fields of the electric, electronic, automobile and machine industries.

Furthermore, polyarylate resins made from bisphenol A as a raw material for a divalent phenol (referred to as bisphenol A polyarylates) have been applied to the production of electronic parts such as films for capacitors by utilizing their good solubility in various solvents and excellent electrical characteristics (insulating properties and dielectric characteristics) and wear resistance. Such polyarylate resins have also been used for forming various coating films and as coating resins for liquid crystal displays by utilizing their wear resistance and scratch resistance.

In the fields of films and the like requiring surface gloss or in the application of coating materials and the like forming coatings, there has been an increasing demand for resins having improved electrical characteristics and wear resistance. However, the bisphenol A polyarylates when used in some applications are deficient in these characteristics.

British Patent 901,605 describes a polyarylate which possibly solves such problems composed of 2,2-bis(3-methyl-4-hydroxyphenyl)propane (also referred to as phenol C) and terephthalic acid, and having an intrinsic viscosity in tetrachloroethane of 0.84. However, this patent publication does not refer to the wear resistance of the polymer. Furthermore, the polyarylates described in the examples of British Patent 901,605 are brittle because their only acid component is terephthalic acid, and they have insufficient wear resistance because their intrinsic viscosity is about 0.84.

Furthermore, JP-A-9-22126 (the term "JP-A" as used herein means an "unexamined published Japanese patent application") describes an electrophotographic photoreceptor using a polyarylate composed of bisphenol C, terephthalic acid and isophthalic acid, and having an inherent viscosity in tetrachloroethane at a concentration of 1 g/dl at 25° C. of 0.833, as an example. The electrophotographic photoreceptor using this polymer still has a low molecular weight, so that it has insufficient wear resistance as a resin for coating formation. JP-A-9-22126 further describes an electrophotographic photoreceptor using a polyarylate having an inherent viscosity of 1.241 which provides excellent wear resistance. However, it is pointed out that a coating solution of this polyarylate has poor storage stability. Furthermore, this polymer having an inherent viscosity of 1.241 is a polymer synthesized using tetramethylbenzylammonium chloride as a catalyst, and therefore has a high carboxyl value which gives rise to a problem in electrical characteristics. Furthermore, the poor storage stability of the coating solution is also caused by its high carboxyl value.

In view of the above, there is a need for resins for coating formation having excellent wear resistance and electric characteristics, as well as a coating solution thereof having good storage stability.

SUMMARY OF THE INVENTION

It is therefore an object of the present invention to provide a resin for coating formation containing specific divalent phenol units, having a high molecular weight and improved wear resistance and electrical characteristics, and also to a coating solution thereof having excellent storage stability.

Another object of the present invention is to provide a method for easily producing such a resin for coating formation.

As a result of conducting extensive studies for solving such problems, the present inventors have discovered that the use of a specific polymerization catalyst during interfacial polymerization can provide polyarylates each composed of units derived from bisphenol C, terephthalic acid and isophthalic acid, having a molecular weight higher than a specific value and having a low carboxyl value. The present inventors also discovered that these polyarylates are superior to previously known bisphenol C polyarylates as well as bisphenol A polyarylates, in terms of wear resistance and electrical characteristics, and are suitable as resins for coating formation, to thereby achieve the present invention.

Namely, a first aspect of the present invention is to provide a resin for coating formation comprising a polyarylate comprising 2,2-bis(3-methyl-4-hydroxyphenyl)propane units and a divalent carboxylic acid component comprising 10 to 90 mol % of terephthalic acid units and 90 to 10 mol % of isophthalic acid units, having an inherent viscosity measured in 1,1,2,2-tetrachloroethane at a concentration of 1 g/dl at 25° C. of 0.85 or more, and having a carboxyl value of 20 mol/ton or less. A second aspect of the present invention is to provide a method for producing a resin for coating formation, which comprises reacting a divalent carboxylic acid halide dissolved in an organic solvent incompatible with water with a divalent phenol dissolved in an aqueous solution of an alkali by interfacial polymerization and in the presence of a catalyst to provide a polyarylate, wherein said catalyst comprises a quaternary ammonium salt or a quaternary phosphonium salt having at least 3 alkyl groups each having at least 3 carbon atoms.

DETAILED DESCRIPTION OF THE INVENTION

The present invention will be described in detail below.

The resin for coating formation of the present invention comprises a polyarylate which comprises a divalent phenol component comprising units derived from 2,2-bis(3-methyl-4-hydroxyphenyl)propane, and a divalent carboxylic acid component comprising 10 to 90 mol % of units derived from terephthalic acid and 90 to 10 mol % of units derived from isophthalic acid. A divalent phenol component constituting this polyarylate is 2,2-bis(3-methyl-4-hydroxyphenyl)propane (bisphenol C), and a divalent phenol other than bisphenol C can be copolymerized in an amount of up to 20 mol %. If the amount of the divalent phenol other than bisphenol C exceeds 20 mol %, the wear resistance provided by bisphenol C unfavorably tends to deteriorate.

Examples of the copolymerizable divalent phenols other than bisphenol C include terpene diphenols such as 2-methyl-4,4'-dihydroxybiphenyl, 3-methyl-4,4'-dihydroxybiphenyl, 2-chloro-4,4'-dihydroxy-biphenyl, 3-chloro-4,4'-dihydroxybiphenyl, 3,3'-dimethyl-4,4'-dihydroxybiphenyl, 2,2'-dimethyl-4,4'-dihydroxybiphenyl, 2,3'-dimethyl-4,4'-dihydroxybiphenyl, 3,3'-dichloro-4,4'-dihydroxybiphenyl, 3,3'-di-tert-butyl-4,4'-dihydroxybiphenyl, 3,3'-dimethoxy-4,4'-dihydroxybiphenyl, 3,3',5,5'-tetramethyl-4,4'-dihydroxybiphenyl, 3,3',5,5'-tetra-tert-butyl-4,4'-dihydroxybiphenyl, 3,3',5,5'-tetrachloro-4,4'-dihydroxybiphenyl, 2,2'-dihydroxy-3,3'-dimethylbiphenyl, 3,3'-difluoro-4,4'-biphenol, 2,2'-dihydroxy-3,3',5,5'-tetramethylbiphenyl, 3,3',5,5'-tetrafluoro-4,4'-biphenol, 2,2',3,3',5,5'-hexamethyl-4,4'-biphenol, bis(4-hydroxyphenyl)methane, 1,1-bis(4-hydroxyphenyl)ethane, bis(4-methyl-2-hydroxyphenyl)methane, bis(3,5-dimethyl-4-hydroxyphenyl)methane, 1,1-bis(4-hydroxyphenyl)cyclohexane, 2,2-bis(4-hydroxyphenyl)-4-methylpentane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)-1-phenylethane, 1,1-bis(4-hydroxyphenyl)-2-ethylhexane, 2,2-bis(3-phenyl-4-hydroxyphenyl)propane, bis(3-methyl-4-hydroxyphenyl)methane, 2,2-bis(4-hydroxyphenyl)butane, 1,1-bis(4-hydroxyphenyl)-2-methylpropane, bis(4-hydroxyphenyl)phenylmethane, 2,2-bis(4-hydroxyphenyl)octane, 1,1-bis(3-methyl-4-hydroxyphenyl)cyclohexane, 2,2-bis(3-allyl-4-hydroxyphenyl)propane, 2,2-bis(3-isopropyl-4-hydroxyphenyl)propane, 2,2-bis(3-tert-butyl-4-hydroxyphenyl)propane, 2,2-bis(3-sec-butyl-4-hydroxyphenyl)propane, 1,1-bis(2-methyl-4-hydroxy-5-tert-butylphenyl)-2-methylpropane, 4,4'-[1,4-phenylene-bis(1-methylethylidene)]bis(3-methyl-4-hydroxyphenyl), 1,1-bis(3-phenyl-4-hydroxyphenyl)cyclohexane, bis(2-hydroxyphenyl)methane, 2,4'-methylenebisphenol, bis(3-methyl-4-hydroxyphenyl)methane, 1,1-bis(4-hydroxyphenyl)propane, 1,1-bis(2-hydroxy-5-methylphenyl)ethane, 1,1-bis(4-hydroxyphenyl)-3-methylbutane, bis(2-hydroxy-3,5-dimethylphenyl)methane, 1,1-bis(4-hydroxyphenyl)cyclopentane, 1,1-bis(3-methyl-4-hydroxyphenyl)cyclopentane, 3,3-bis(4-hydroxyphenyl)pentane, 3,3-bis(3-methyl-4-hydroxyphenyl)pentane, 3,3-bis(3,5-dimethyl-4-hydroxyphenyl)pentane, 2,2-bis(2-hydroxy-3,5-dimethylphenyl)propane, 2,2-bis(4-hydroxyphenyl)nonane, 1,1-bis(3-methyl-4-hydroxyphenyl)-1-phenylethane, 1,1-bis(3,5-dimethyl-4-hydroxyphenyl)cyclohexane, 2,2-bis(4-hydroxyphenyl)decane, 1,1-bis(4-hydroxyphenyl)decane, 1,1-bis(2-hydroxy-3-tert-butyl-5-methylphenyl)methane, bis(4-hydroxyphenyl)diphenylmethane, terpene diphenol, 1,1-bis(3-tert-butyl-4-hydroxyphenyl)cyclohexane, 1,1-bis(2-methyl-4-hydroxy-5-tert-butylphenyl)-2-methyl-propane, 2,2-bis(3-cyclohexyl-4-hydroxyphenyl)propane, bis(3,5-di-tert-butyl-4-hydroxyphenyl)methane, bis(3,5-di-sec-butyl-4-hydroxyphenyl)methane, 1,1-bis(3-cyclohexyl-4-hydroxyphenyl)cyclohexane, 1,1-bis(2-hydroxy-3,5-di-tert-butylphenyl)ethane, 1,1-bis(3-nonyl-4-hydroxyphenyl)methane, 2,2-bis(3,5-di-tert-butyl-4-hydroxyphenyl)propane, 1,1-bis(2-hydroxy-3,5-di-tert-butyl-6-methylphenyl)methane, 1,1-bis(3-phenyl-4-hydroxyphenyl)-1-phenylethane, butyl α,α'-bis(4-hydroxyphenyl)acetate, 1,1-bis(3-fluoro-4-hydroxyphenyl)methane, bis(2-hydroxy-5-fluorophenyl)methane, 2,2-bis(3-fluoro-4-hydroxyphenyl)propane, 1,1-bis(3-fluoro-4-hydroxyphenyl)-1-phenylmethane, 1,1-bis(3-fluoro-4-hydroxyphenyl)-1-(p-fluorophenyl)methane, 1,1-bis(4-hydroxyphenyl)-1-(p-fluorophenyl)methane, 2,2-bis(3-chloro-4-hydroxy-5-methylphenyl)propane, 2,2-bis(3,5-dichloro-4-hydroxyphenyl)propane, 2,2-bis(3-chloro-4-hydroxyphenyl)propane, 1,1-bis(3,5-dibromo-4-hydroxyphenyl)methane, 2,2-bis(3,5-dibromo-4-hydroxyphenyl)propane, 2,2-bis(3-nitro-4-hydroxyphenyl)propane, bis(4-hydroxyphenyl)dimethylsilane, bis(2,3,5-trimethyl-4-hydroxyphenyl)-1-phenylmethane, 2,2-bis(4-hydroxyphenyl)dodecane, 2,2-bis(3-methyl-4-hydroxyphenyl)dodecane, 2,2-bis(3,5-dimethyl-4-hydroxyphenyl)dodecane, 1,1-bis(3-tert-butyl-4-hydroxyphenyl)-1-phenylethane, 1,1-bis(3,5-di-tert-butyl-4-hydroxyphenyl)-1-phenylethane, 1,1-bis(2-methyl-4-hydroxy-5-cyclohexylphenyl)-2-methylpropane, 1,1-bis(2-hydroxy-3,5-di-tert-butylphenyl)ethane, methyl 2,2-bis(4-hydroxyphenyl)propionate, ethyl 2,2-bis(4-hydroxyphenyl)propionate, 2,2',3,3',5,5'-hexamethyl-4,4'-biphenol, bis(2-hydroxyphenyl)methane, 2,4'-methylenebisphenol, 1,2-bis(4-hydroxyphenyl)ethane, 2-(4-hydroxyphenyl)-2-(2-hydroxyphenyl)propane, bis(2-hydroxy-3-allylphenyl)methane, 1,1-bis(2-hydroxy-3,5-dimethylphenyl)-2-methylpropane, 1,1-bis(2-hydroxy-5-tert-butylphenyl)ethane, bis(2-hydroxy-5-phenylphenyl)methane, 1,1-bis(2-methyl-4-hydroxy-5-tert-butylphenyl)butane, bis(2-methyl-4-hydroxy-5-cyclohexyl-phenyl)methane, 2,2-bis(4-hydroxyphenyl)pentadecane, 2,2-bis(3-methyl-4-hydroxyphenyl)pentadecane, 2,2-bis(3,5-dimethyl-4-hydroxyphenyl)pentadecane, 1,2-bis(3,5-di-tert-butyl-4-hydroxyphenyl)ethane, bis(2-hydroxy-3,5-di-tert-butylphenyl)methane, 2,2-bis(3-styryl-4-hydroxyphenyl)propane, 1,1-bis(4-hydroxyphenyl)-1-(p-nitrophenyl)ethane, bis(3,5-difluoro-4-hydroxyphenyl)methane, bis(3,5-difluoro-4-hydroxyphenyl)-1-phenylmethane, bis(3,5-difluoro-4-hydroxyphenyl)diphenylmethane, bis(3-fluoro-4-hydroxyphenyl)diphenylmethane, 2,2-bis(3-chloro-4-hydroxyphenyl)propane, 1,1-bis(4-hydroxyphenyl)-3,3-dimethyl-5-methyl-cyclohexane, 1,1-bis(4-hydroxyphenyl)-3,3-dimethyl-5,5-dimethyl-cyclohexane, 1,1-bis(4-hydroxyphenyl)-3,3-dimethyl-4-methyl-cyclohexane, 1,1-bis(4-hydroxyphenyl)-3,3-dimethyl-5-ethyl-cyclohexane, 1,1-bis(4-hydroxyphenyl)-3,3-dimethyl-5-methyl-cyclopentane, 1,1-bis(3,5-dimethyl-4-hydroxyphenyl)-3,3-dimethyl-5-methyl-cyclohexane, 1,1-bis(3,5-diphenyl-4-hydroxyphenyl)-3,3-dimethyl-5-methyl-cyclohexane, 1,1-bis(3-methyl-4-hydroxyphenyl)-3,3-dimethyl-5-methyl-cyclohexane, 1,1-bis(3-phenyl-4-hydroxyphenyl)-3,3-dimethyl-5-methyl-cyclohexane, 1,1-bis(3,5-dichloro-4-hydroxyphenyl)-3,3-dimethyl-5-methyl-cyclohexane, 1,1-bis(3,5-dibromo-4-hydroxyphenyl)-3,3-dimethyl-5-methyl-cyclohexane, 1,4-di(4-hydroxyphenyl)-p-menthane, 1,4-di(3-methyl-4-hydroxyphenyl)-p-menthane and 1,4-di(3,5-dimethyl-4-hydroxyphenyl)-p-menthane.

Particularly preferred examples of the divalent phenols include 2,2-bis(4-hydroxyphenyl)propane (bisphenol A), 1,1-bis(4-hydroxyphenyl)cyclohexane (bisphenol Z) and 1,1-bis(4-hydroxyphenyl)-1-phenylethane (bisphenol AP).

The divalent carboxylic acid components constituting the polyarylate of the present invention are mixtures of 10 to 90 mol % of units derived from terephthalic acid and 90 to 10 mol % of units derived from isophthalic acid. Amounts of less than 10 mol % of units derived from terephthalic acid tend to deteriorate storage stability of the coating solution, whereas amounts exceeding 90 mol % tend to deteriorate wear resistance. In particular, a mixture containing about the same amount of terephthalic acid units and isophthalic acid units is preferred.

Furthermore, the termini of the polyarylate of the present invention may be blocked with monovalent phenols, monovalent acid chlorides, monohydric alcohols or monovalent carboxylic acids. The monovalent phenols include phenol, cresol, p-tert-butylphenol and o-phenylphenol, and the monovalent acid chlorides include benzoyl chloride, methanesulfonyl chloride and phenyl chloroformate. The monohydric alcohols include methanol, ethanol, n-propanol, isopropanol, n-butanol, 2-butanol, pentanol, hexanol, dodecyl alcohol, stearyl alcohol, benzyl alcohol and phenethyl alcohol, and the monovalent carboxylic acids include acetic acid, propionic acid, octanoic acid, cyclohexanecarboxylic acid, benzoic acid, toluic acid, phenylacetic acid, p-tert-butylbenzoic acid and p-methoxyphenylacetic acid.

The molecular weight of the polyarylate is represented by the inherent viscosity of a 1 g/dl solution at 25° C. using tetrachloroethane as a solvent for viscosity measurement. The inherent viscosity is 0.85 or more, and preferably 1.0 to 2.5. An inherent viscosity of less than 0.85 results in insufficient wear resistance in some cases. On the other hand, an inherent viscosity exceeding 2.5 results in the development of spinability or an increased viscosity of solutions prepared in coating, which unfavorably tends to make handling become difficult. The molecular weight of the resin of the present invention can be controlled by the amount of terminal blocking materials added in the production thereof.

Furthermore, with respect to the molecular weight distribution of the polyarylate of the present invention, the value of Mw/Mn, the ratio of the weight average molecular weight Mw to the number average molecular weight Mn in terms of polystyrene, is preferably less than 3.0, and more preferably 2.8 or less. If the value of Mw/Mn is 3.0 or more, the wear resistance unfavorably tends to deteriorate by the plasticization of low molecular weight components.

Furthermore, the carboxyl value of the polyarylate of the present invention is 20 mol/ton or less. The carboxyl value has an influence on electric characteristics such as arc resistance and the dielectric constant, so that it is preferably 15 mol/ton or less. The carboxyl value of the resin can be measured by known methods such as neutralization titration utilizing potentiometric titration instruments. When the resins are dissolved in solvents such as toluene, methylene chloride and tetrahydrofuran to prepare coating solutions, the carboxyl value also influences the storage stability of the coating solutions. For this additional reason the carboxyl value is 20 mol/ton or less. When the concentration of the coating solution is as high as about 20% by weight and storage stability is required for a long period of time, the carboxyl value is preferably less than 15 mol/ton. The storage stability can be evaluated by dissolving the resins in the above-noted solvents at a concentration of about 15% to about 20% by weight, enclosing the resulting solutions so that the solvents do not evaporate, and storing the solutions at room temperature or at a specified temperature. When the storage stability is poor, the solutions become cloudy to precipitate solids or the viscosity is increased to cause gelation.

The residual sodium amount of the polyarylate of the present invention is preferably less than 10 ppm. If the residual sodium amount is more than 10 ppm, the above-described electrical characteristics unfavorably tend to deteriorate. The residual sodium amount in the resin can be determined by the use of known methods such as ion chromatographic analysis, atomic absorption analysis and plasma emission spectral analysis.

The phenolic hydroxyl group value of the termini of the polyarylate is preferably 30 mol/ton or less. A phenolic hydroxyl group value exceeding 30 mol/ton unfavorably tends to deteriorate the electrical characteristics, or the phenolic hydroxyl groups tend to oxidize upon heating to color the resins. The phenolic hydroxyl group value of the resins can be directly determined by proton NMR.

Moreover, the amount of quaternary ammonium salts or quaternary phosphonium salts remaining in the polyarylate of the present invention is preferably less than 100 ppm when measured by gas chromatography, and more preferably less than 5 ppm. If the amount of the residual quaternary ammonium salts or quaternary phosphonium salts is 100 ppm or more, the dielectric breakdown strength unfavorably tends to decrease.

Interfacial polymerization is suitably employed as a method for producing the polyarylate for obtaining a resin for coating formation of the present invention. Interfacial polymerization comprises mixing divalent carboxylic acid halides dissolved in organic solvents incompatible with water with divalent phenols dissolved in aqueous solutions of alkalis as described, for example, by W. M. Eareckson, *J. Poly. Sci.*, XL399, (1959) and in JP-B-40-1959 (the term "JP-B" as used herein means an "examined Japanese patent publication"). The interfacial polymerization reaction proceeds rapidly as compared with solution polymerization, so that the hydrolysis of acid halides can be minimized. In particular, interfacial polymerization is advantageous when high molecular weight polymers as used in the present invention are obtained by selecting polymerization catalysts as described below.

The method for producing the polyarylate of the present invention by interfacial polymerization is now described in further detail. The alkaline aqueous solutions of the divalent phenols are prepared, and subsequently, a polymerization catalyst is added thereto. The alkalis which can be used herein include sodium hydroxide and potassium hydroxide.

There is no particular limitation on the polymerization catalyst, as long as it provides polymers having a high molecular weight and a low carboxyl value. However, quaternary ammonium salts or quaternary phosphonium salts each having at least 3 alkyl groups each having at least 3 carbon atoms are preferred in that they provide polymers having a high molecular weight and a low carboxyl value. The use of quaternary ammonium salts or quaternary phosphonium salts each having 2 or less alkyl groups each having at least 3 carbon atoms provides a slow reaction rate, so that high molecular weight polymers are not obtained, or even if obtained, the carboxyl value tends to be high. Such salts are therefore unfavorable. Taking the residual amount of the polymerization catalyst in the polymer into consideration as described above, quaternary ammonium salts having a distribution ratio measured in a water-chloroform system at 20° C. ranging from $2.0 \times 10^{-2}$ to 1.5 are preferred in that the polymerization rate is high and the polymerization catalyst is easily removed from polymer solution after polymerization. A distribution ratio of less than $2.0 \times 10^{-2}$ tends to decrease the polymerization rate, whereas a distribution ratio exceeding 1.5 results in increased lipophilicity such that it tends to become difficult to remove the ammonium salts from the polymer.

Specific examples of the polymerization catalyst for use in the present invention include tripropylbenzylammonium halides, tributylbenzylammonium halides, tributylmethylammonium halides, tetrabutylammonium halides, tetrabutylphosphonium halides and tributylbenzylphosphonium halides, and the halides include but are not particularly limited to chlorides, bromides and iodides.

On the other hand, solutions of the divalent carboxylic acid halides dissolved in organic solvents incompatible with water and which dissolve the polyarylates, for example, chlorine solvents such as methylene chloride, 1,2-dichloroethane, chloroform, carbon tetrachloride, chlorobenzene, 1,1,2,2-tetrachloroethane, 1,1,1-trichloroethane, o-dichlorobenzene, m-dichlorobenzene and p-dichlorobenzene, and aromatic hydrocarbons such as toluene, benzene and xylene, are mixed with the above-described alkaline solutions. The reaction is conducted with stirring at a temperature of 25° C. or less for 1 hour to 5 hours, to thereby obtain the resin of the present invention.

The resin for coating formation of the present invention comprises the polyarylate of the present invention which is substantially noncrystalline, has a high molecular weight, has excellent electrical characteristics and wear resistance, and has a high solubility in general-purpose solvents such as methylene chloride, 1,2-dichloroethane, chloroform, carbon tetrachloride, chlorobenzene, 1,1,2,2-tetrachloroethane, 1,1,1-trichloroethane, o-dichloroebenzene, m-dichloroebenzene, p-dichloroebenzene, toluene, benzene, xylene, and tetrahydrofuran. Accordingly, the resin can be dissolved in such solvents to easily prepare a coating solution. The coating solution, to which various additives are added if necessary, is applied onto a base material, and the solvent is then removed to form a coating, to thereby obtain a coated product or the coating is separated from the base material to obtain a film. When a coating solution is prepared, preferably the resin is completely dissolved at a concentration of at least about 10% by weight, preferably about 15% to about 20% by weight. A concentration of less than 10% by weight sometimes results in a deterioration of coating properties, or an uneven film thickness when the coating solution is applied.

The resin for coating formation of the present invention may contain various antioxidants such as hindered phenol, hindered amine, thioether and phosphorus antioxidants within such a range that the resin characteristics are not impaired. The resin may further contain various fillers, for example, conductive fillers such as carbon black, acetylene black, and metal powders, silica and talc.

Furthermore, the resin for coating formation can be used as a resin for binders and as a resin for films, and the coated products and the films can be produced by flow casting using a coating solution as described above, by melt extrusion or by calendering. The resin for coating formation of the present invention is useful as an insulating material of electrical apparatuses such as motors, transformers and generators, and as a coating materials of electric wires or dielectric films for condensers. The resin for coating formation of the present invention is further applicable to liquid crystal display boards and various substrates, and can be widely applied to the fields of electric and electronic industries.

The present invention will be described in greater detail with respect to the following Examples and Comparative Examples, but it is to be understood that the present invention is not to be construed as being limited thereto, and that various changes and modifications may be made without departing from the spirit and scope of the invention.

EXAMPLE 1

In a reaction vessel equipped with a stirrer, 100 parts by weight of 2,2-bis(3-methyl-4-hydroxyphenyl)propane, 1.17 parts by weight of p-tert-butylphenol (referred to as PTBP), 40.98 parts by weight of sodium hydroxide and 0.82 part by weight of tri-n-butylbenzylammonium chloride as a polymerization catalyst were placed, and dissolved in 2720 parts by weight of water (an aqueous phase).

Apart from this, 79.99 parts by weight of a 1/1 terephthalyl chloride/isophthalyl chloride mixture (referred to as MPC for brevity) was dissolved in 2032 parts by weight of methylene chloride (an organic phase). This organic phase was added to the aqueous phase previously prepared, with vigorous stirring, and a polymerization reaction was conducted at 20° C. for 3 hours. Thereafter, 15 parts by weight of acetic acid was added to terminate the reaction, and the organic phase was separated from the aqueous phase. Washing and separating with a 2-fold volume of ion-exchanged water in relation to the organic phase for every washing were repeatedly applied to this organic phase. The washing was stopped at the time when the electric conductivity of the wash water reached 20 $\mu$S. The organic phase after washing was poured into a hot water tank equipped with a homomixer at 50° C. to evaporate methylene chloride, to obtain a powdery polymer. Then, the polymer was dehydrated and dried to obtain a resin for coating formation.

EXAMPLES 2 TO 17 AND COMPARATIVE EXAMPLES 1 TO 3

Resins for coating formation were produced in the same manner as in Example 1, except that the amounts of p-tert-butylphenol, sodium hydroxide and MPC per 100 parts by weight of 2,2-bis(3-methyl-4-hydroxyphenyl)propane, the kind and amount of polymerization catalyst and the washing degree of the organic phase were changed. These conditions are shown in Table 1.

COMPARATIVE EXAMPLES 4 AND 5

Resins were produced in the same manner as in Example 1, except that 100 parts by weight of 2,2-bis(4-hydroxyphenyl)propane and 100 parts by weight of 1,1-bis(4-hydroxyphenyl)cyclohexane were each used in place of 2,2-bis(3-methyl-4-hydroxyphenyl)propane. The reactants and reaction conditions are shown in Table 1.

COMPARATIVE EXAMPLE 6

A resin was produced in the same manner as in Example 1, except that terephthalyl chloride was used in place of MPC, based on the examples given in British Patent 901,605, under the reaction conditions shown in Table 1.

Evaluation of Resin:

The properties of the resins synthesized as described above were evaluated. The results are shown in Table 2. The properties were evaluated using the following methods:

1) Inherent Viscosity

The inherent viscosity was measured using 1,1,2,2-tetrachloroethane as a solvent, at a temperature of 25° C. and a concentration of 1-g/dl.

2) Carboxyl Value

Resin (0.15 g) was accurately weighed into a test tube, and dissolved in 5 ml of benzyl alcohol by heating. After mixing the solution of the polymer in benzyl alcohol with 10 ml of chloroform, Phenol Red was added thereto as an indicator. This was followed by neutralization titration with a 0.1 N solution of KOH in benzyl alcohol with stirring to determine the carboxyl value.

3) Molecular Weight Distribution

Using a liquid chromatograph (600 series) manufactured by Waters Co. and a MIX-Gel Column manufactured by Polymer Laboratory Co., the number average molecular weight and weight average molecular weight in terms of polystyrene were measured. The measurement was made using chloroform as a solvent at 40° C. From this value, the distribution ratio of the molecular weight was calculated.

4) Phenolic Hydroxyl Group Value

Polymer was dissolved in $CDCl_3$, and the phenolic hydroxyl group value was measured by proton NMR.

5) Amount of Residual Sodium

Nitric acid was added to a polymer, and heat treatment was conducted with a microwave wet decomposing device. Sulfuric acid and perchloric acid were added in turn, and heat decomposition treatment was similarly repeated to thereby dissolve the sample. The resulting solution was analyzed with an atomic absorption analyzer to determine the amount of residual Na in the polymer.

6) Amount of Residual Catalyst

After dissolving a polymer in chloroform, methanol was added to the resulting solution to re-precipitate the polymer. Then, a specific amount of diphenyl was added as an internal standard, and this methanol solution containing a residual catalyst was analyzed with a gas chromatography instrument (HP-5890 series II, manufactured by Hewlett Packard Co.) to determine the amount of the catalyst remaining in the polymer.

7) Wear Resistance

First, resin was dissolved in methylene chloride, and a cast film having a thickness of 100 Im was prepared. For this film, a decrease in weight after a 10000-cycle test at a load of 250 g was measured using a Taber abrasion tester (truck wheel: CS-10F), and the resulting value was taken as an indication of wear resistance.

8) Storage Stability

A resin was dissolved in methylene chloride in an amount of 15% by weight to prepare a resin solution. Then, the solution was allowed to stand at 25° C. for 1 month, and the state thereof was visually evaluated.

9) Dielectric Constant

A solvent cast film having a thickness of 50 $\mu$m was prepared from a solution of a polyarylate in methylene chloride. Using this film as a test piece, the dielectric constant was measured at 1 MHz according to ASTM D-150.

10) Dielectric Breakdown Voltage

Using the same 50-$\mu$m thick polyarylate film as prepared in 9) above, the dielectric breakdown voltage was measured according to ASTM D-149.

TABLE 1

| | Reactants and Reaction Conditions for Producing Polyarylate | | | | | | |
|---|---|---|---|---|---|---|---|
| | | MPC | PTBP | Alkali | Polymerization Catalyst | | Washing |
| | Kind of *1 Bisphenol | (parts by weight) | (parts by weight) | (parts by weight) | Kind*2 | Distribution Ratio | Parts by Weight | Degree (conductivity-$\mu$S) |
| Example 1 | Bisphenol C | 79.99 | 1.17 | 40.98 | TBBAC | 1.57 | 0.82 | 20 |
| Example 2 | Bisphenol C | 79.91 | 1.05 | 40.94 | TBBAC | 1.57 | 0.82 | 20 |
| Example 3 | Bisphenol C | 79.83 | 0.94 | 40.89 | TBBAC | 1.57 | 0.82 | 20 |
| Example 4 | Bisphenol C | 79.67 | 0.70 | 40.81 | TBBAC | 1.57 | 0.82 | 20 |
| Example 5 | Bisphenol C | 79.99 | 1.17 | 40.98 | TPBAC | $3.84 \times 10^{-2}$ | 0.72 | 20 |
| Example 6 | Bisphenol C | 79.91 | 1.05 | 40.94 | TPBAC | $3.84 \times 10^{-2}$ | 0.72 | 20 |
| Example 7 | Bisphenol C | 79.83 | 0.94 | 40.89 | TPBAC | $3.84 \times 10^{-2}$ | 0.72 | 20 |
| Example 8 | Bisphenol C | 79.91 | 1.05 | 40.94 | TOMAC | 56.6 | 0.85 | 20 |
| Example 9 | Bisphenol C | 79.91 | 1.05 | 40.94 | TBAB | 5.26 | 0.82 | 20 |
| Example 10 | Bisphenol C | 79.91 | 1.05 | 40.94 | TBBAC | 1.57 | 0.85 | 50 |
| Example 11 | Bisphenol C | 79.91 | 1.05 | 40.94 | TBBAC | 1.57 | 0.85 | 100 |
| Example 12 | Bisphenol C | 79.91 | 1.05 | 40.94 | TBBAC | 1.57 | 0.85 | 200 |
| Example 13 | Bisphenol C | 79.91 | 1.05 | 40.94 | TPBAC | $3.84 \times 10^{-2}$ | 0.72 | 50 |
| Example 14 | Bisphenol C | 79.91 | 1.05 | 40.94 | TPBAC | $3.84 \times 10^{-2}$ | 0.72 | 100 |
| Example 15 | Bisphenol C | 79.91 | 1.05 | 40.94 | TPBAC | $3.84 \times 10^{-2}$ | 0.72 | 200 |
| Example 16 | Bisphenol C | 79.20 | 0.70 | 40.98 | TBBAC | 1.57 | 0.85 | 20 |
| Example 17 | Bisphenol C | 78.40 | 0.70 | 40.98 | TBBAC | 1.57 | 0.85 | 20 |
| Comparative Example 1 | Bisphenol C | 80.46 | 1.87 | 41.38 | TBBAC | 1.57 | 0.85 | 20 |
| Comparative Example 2 | Bisphenol C | 80.76 | 1.73 | 40.62 | TMBAC | $1.79 \times 10^{-2}$ | 0.5 | 20 |
| Comparative Example 3 | Bisphenol C | 78.89 | 0.00 | 40.60 | TMBAC | $1.79 \times 10^{-2}$ | 0.5 | 20 |
| Comparative Example 4 | Bisphenol A | 89.83 | 1.18 | 38.86 | TBBAC | 1.57 | 0.82 | 20 |
| Comparative Example 5 | Bisphenol Z | 83.65 | 1.10 | 42.86 | TBBAC | 1.57 | 0.82 | 20 |
| Comparative Example 6 | Bisphenol C | 78.89*3 | 0.0 | 40.60 | TEBAC | $1.96 \times 10^{-2}$ | 2.6 | 20 |

*1: Bisphenol C: 2,2-Bis (3-methyl-4-hydroxyphenyl)propane
Bisphenol A: 2,2-Bis (4-hydroxyphenyl)propane
Bisphenol Z: 1,1-Bis (4-hydroxyphenyl)cyclohexane
*2: TBBAC: Tri-n-butylbenzylammonium Chloride
TPBAC: Tri-n-propylbenzylammonium Chloride
TOMAC: Tri-n-octylmethylammonium Chloride
TEBAC: Triethylbenzylammonium Chloride
TMBAC: Trimethylbenzylammonium Chloride
*3: In Comparative Example 6, 100 mol % of terephthalic acid was used as the dicarboxylic acid component

TABLE 2

Properties of Polyarylate

|  | Inherent Viscosity (dl/g) | Molecular Weight·Molecular Weight Distribution | | | Carboxyl Value (mol/ton) | Hydroxyl Group Value (mol/ton) | Residual Na Amount (ppm) | Residual Catalyst Amount (ppm) |
| --- | --- | --- | --- | --- | --- | --- | --- | --- |
|  |  | Mw | Mn | Mw/Mn |  |  |  |  |
| Example 1 | 0.92 | 122600 | 36000 | 3.4 | 12.2 | 20 | 1.3 | 18 |
| Example 2 | 1.04 | 152400 | 43500 | 3.5 | 10.1 | 19 | 1.4 | 22 |
| Example 3 | 1.23 | 205000 | 58600 | 3.5 | 9.8 | 17 | 2.0 | 24 |
| Example 4 | 1.40 | 258100 | 73700 | 3.5 | 7.3 | 13 | 1.1 | 13 |
| Example 5 | 0.98 | 137100 | 54900 | 2.5 | 13.2 | 21 | 1.9 | 2 |
| Example 6 | 1.17 | 173300 | 72200 | 2.4 | 11.5 | 18 | 1.2 | 4 |
| Example 7 | 1.29 | 210200 | 84100 | 2.5 | 10.1 | 16 | 1.3 | 3 |
| Example 8 | 1.08 | 163000 | 32600 | 5.0 | 10.0 | 19 | 1.9 | 120 |
| Example 9 | 1.01 | 144700 | 34400 | 4.2 | 9.9 | 19 | 2.2 | 74 |
| Example 10 | 1.04 | 152400 | 43500 | 3.4 | 10.1 | 20 | 2.8 | 29 |
| Example 11 | 1.04 | 152400 | 43500 | 3.4 | 10.1 | 20 | 5.9 | 46 |
| Example 12 | 1.04 | 152400 | 43500 | 3.4 | 10.1 | 20 | 9.7 | 67 |
| Example 13 | 0.98 | 137100 | 54900 | 2.5 | 11.5 | 21 | 2.8 | 75 |
| Example 14 | 0.98 | 137100 | 54900 | 2.5 | 11.5 | 21 | 5.9 | 3 |
| Example 15 | 0.98 | 137100 | 54900 | 2.5 | 11.5 | 21 | 9.2 | 6 |
| Example 16 | 1.01 | 138700 | 42000 | 3.3 | 12.8 | 28 | 1.7 | 8 |
| Example 17 | 0.97 | 129800 | 38200 | 3.4 | 13.1 | 34 | 1.9 | 19 |
| Comparative Example 1 | 0.80 | 98300 | 26600 | 3.7 | 15.2 | 19 | 2.3 | 22 |
| Comparative Example 2 | 0.81 | 99000 | 28300 | 3.5 | 27.8 | 18 | 2.1 | 2 |
| Comparative Example 3 | 1.24 | 197500 | 51900 | 3.8 | 23.1 | 22 | 1.8 | 3 |
| Comparative Example 4 | 1.04 | 158400 | 42800 | 3.7 | 7.8 | 19 | 2.0 | 24 |
| Comparative Example 5 | 1.01 | 152100 | 39000 | 3.9 | 11.2 | 21 | 1.1 | 19 |
| Comparative Example 6 | 0.48 | 38700 | 7000 | 5.5 | 32.7 | 25 | 2.4 | 4 |

Polyarylate Properties

|  | Wear Amount (mg) | Storage Stability | Dielectric Constant | Dielectric Breakdown Voltage (kV/mm) |
| --- | --- | --- | --- | --- |
| Example 1 | 1.9 | No change | 3.1 | 270 |
| Example 2 | 1.9 | No change | 3.2 | 270 |
| Example 3 | 1.5 | No change | 3.2 | 270 |
| Example 4 | 1.3 | No change | 3.2 | 270 |
| Example 5 | 1.9 | No change | 3.3 | 275 |
| Example 6 | 1.4 | No change | 3.3 | 275 |
| Example 7 | 1.2 | No change | 3.3 | 275 |
| Example 8 | 1.8 | No change | 2.9 | 265 |
| Example 9 | 1.8 | No change | 3.0 | 265 |
| Example 10 | 1.9 | No change | 3.1 | 265 |
| Example 11 | 1.9 | No change | 3.1 | 265 |
| Example 12 | 1.9 | No change | 3.0 | 260 |
| Example 13 | 1.9 | No change | 3.0 | 260 |
| Example 14 | 1.9 | No change | 3.3 | 270 |
| Example 15 | 1.8 | No change | 3.3 | 265 |
| Example 16 | 1.8 | No change | 3.1 | 265 |
| Example 17 | 1.9 | No change | 3.0 | 260 |
| Comparative Example 1 | 2.7 | No change | 3.2 | 265 |
| Comparative Example 2 | 2.8 | gelation | 3.1 | 260 |
| Comparative Example 3 | 1.8 | gelation | 3.0 | 260 |
| Comparative Example 4 | 2.3 | gelation | 3.2 | 265 |
| Comparative Example 5 | 2.4 | clouded | 3.2 | 260 |
| Comparative Example 6 | 5.7 | clouded | 2.8 | 235 |

The above results demonstrate the following:

1) From a comparison of the Examples of the invention with Comparative Examples 1, 2 and 6, the polyarylates of the present invention have a high molecular weight and excellent wear resistance.

2) From a comparison of the Examples of the invention with Comparative Examples 2, 3 and 6, the polyarylates of the present invention have excellent electrical characteristics because of their low carboxyl value.

3) From a comparison of the Examples of the invention with Comparative Examples 4 and 5, the polyarylates of the present invention have excellent wear resistance because they contain 2,2-bis(3-methyl-4-hydroxyphenyl)propane units.

The resin for coating formation of the present invention comprises a polyarylate having a high molecular weight, and excellent electrical characteristics and wear resistance. Also, the polyarylate is soluble in solvents so that coating solutions thereof can be easily prepared. Accordingly, the inventive resin is dissolved in a solvent to prepare a coating solution. The coating solution is applied onto a substrate, followed by solvent removal to form a coating. As a result, a coated product is obtained, or a coating is separated from the substrate to obtain a film. Thus, the resin for coating formation of the present invention can be applied to various electric and electronic materials. Furthermore, according to the method of the present inventions such resins for coating formation can be easily produced.

While the invention has been described in detail and with reference to specific examples thereof, it will be apparent to one skilled in the art that various changes and modifications can be made therein without departing from the spirit and scope thereof.

What is claimed is:

1. A resin for coating formation which comprises a polyarylate comprising 2,2-bis(3-methyl-4-hydroxyphenyl) propane units and a divalent carboxylic acid component comprising 10 to 90 mol % of terephthalic acid units and 90 to 10 mol % of isophthalic acid units, wherein said polyarylate has an inherent viscosity measured in 1,1,2,2-tetrachloroethane at a concentration of 1 g/dl at 25° C. of 0.85 or more and a carboxyl value of 20 mol/ton or less.

2. The resin according to claim 1, wherein said polyarylate has a residual Na amount of less than 10 ppm.

3. The resin according to claim 1, wherein said polyarylate contains a quaternary ammonium salt or a quaternary phosphonium salt in an amount of less than 100 ppm as measured by gas chromatography.

4. The resin according to claim 3, wherein said polyarylate contains a quaternary ammonium salt or a quaternary phosphonium salt in an amount of less than 5 ppm as measured by gas chromatography.

5. The resin according to claim 1, wherein said polyarylate has a phenolic hydroxyl group value of 30 mol/ton or less.

6. The resin according to claim 1, wherein said polyarylate has a ratio (Mw/Mn) of the weight average molecular weight Mw to the number average molecular weight Mn in terms of polystyrene of less than 3.0.

7. A method for producing a resin for coating formation which comprises reacting a divalent carboxylic acid halide dissolved in an organic solvent incompatible with water with a divalent phenol dissolved in an aqueous solution of an alkali by interfacial polymerization and in the presence of a catalyst to provide a polyarylate, wherein said catalyst comprises a quaternary ammonium salt or a quaternary phosphonium salt each having at least 3 alkyl groups each having at least 3 carbon atoms.

8. The method according to claim 7, which comprises reacting in the presence of a catalyst comprising a quaternary ammonium salt having a distribution ratio measured in a water-chloroform system at 20° C. ranging from $2.0\times10^{-2}$ to 2.5.

9. The resin according to claim 1, containing divalent phenol units other than 2,2-bis(3-methyl-4-hydroxyphenyl) propane units in an amount of 20 mol % or less.

10. The resin according to claim 1, wherein the divalent carboxylic acid component comprises about the same amount of terephthalic acid units and isophthalic acid units.

11. The resin according to claim 1, wherein said polyarylate has an inherent viscosity of 1.0 to 2.5.

12. The resin according to claim 1, wherein said polyarylate has a carboxyl value of 15 mol/ton or less.

13. A coating solution comprising a solution of a solvent and a polyarylate resin, said polyarylate resin comprising a divalent phenol component comprising at least 80 mol % of 2,2-bis(3-methyl-4-hydroxyphenyl)propane units and a divalent carboxylic acid component comprising 10 to 90 mol % of terephthalic acid units and 90 to 10 mol % of isophthalic acid units, wherein said polyarylate has an inherent viscosity measured in 1,1,2,2-tetrachloroethane at a concentration of 1 g/dl at 25° C. of 0.85 or more and a carboxyl value of 20 mol/ton or less.

14. The coating solution as claimed in claim 13, wherein said solvent is selected from the group consisting of methylene chloride, 1,2-dichloroethane, chloroform, carbon tetrachloride, chlorobenzene, 1,1,2,2-tetrachloroethane, 1,1,1-trichloroethane, o-dichloroebenzene, m-dichloroebenzene, p-dichloroebenzene, toluene, benzene, xylene, and tetrahydrofuran.

* * * * *